United States Patent Office 3,073,474
Patented Jan. 15, 1963

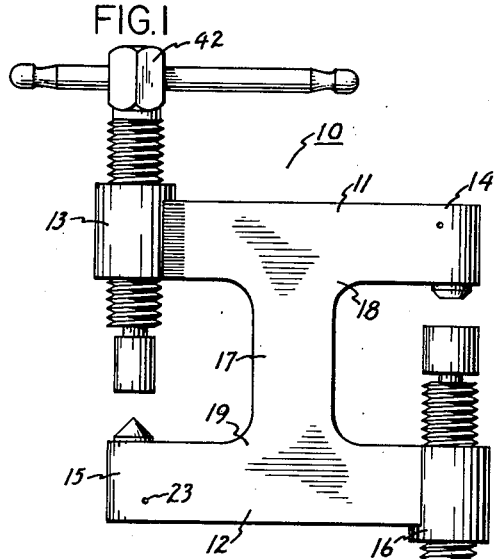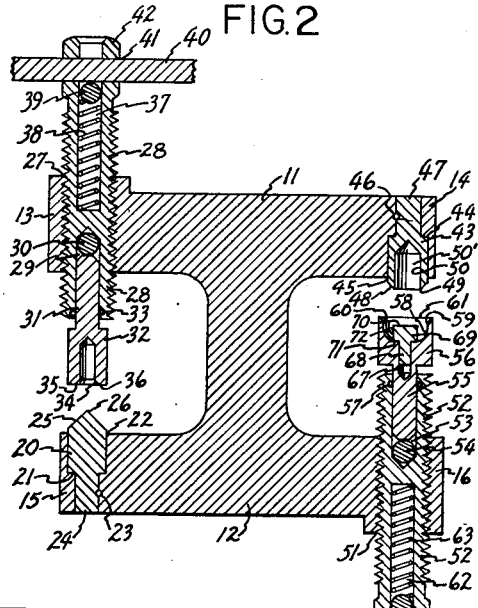

3,073,474
APPLYING TOOL FOR SPRING-LOADED FASTENERS
Fred M. Gibson, Box 45, Niceville, Fla., and William E. Preston, 586 N. Magnolia Drive, Fort Walton Beach, Fla.
Filed Sept. 15, 1958, Ser. No. 761,060
3 Claims. (Cl. 218—19)

This invention pertains to an applying tool for spring-loaded fasteners and specifically to a self-contained tool particularly adapted for installing spiral cam fasteners of the type comprising a cylindrical sleeve with a body portion and a reduced end portion, a headed stud element having a shank extending through the reduced end portion and a head in the body portion, and with a compression spring disposed in the body portion surrounding the shank and disposed between the head and the reduced end portion urging the head outwardly in a direction away from the reduced end portion, a specific type of such fastener being shown and described in U.S. Patent No. 2,564,101, dated August 14, 1951, to William Dzus.

An object of the invention is to provide an improved tool for installing fasteners of the above identified type. A specific object is to provide a self-contained unitary tool for installing such fasteners on panels in situ on an aircraft or elsewhere conveniently and with no workbench and with no other equipment.

Fasteners of the type for the installation of which the tool of this invention is particularly adapted are in common use in aircraft, missiles, and military vehicles and vessels, and such fasteners are commonly employed to attach panels together, or to attach panels to other objects. The replacement of fasteners in panels is a troublesome maintenance task, and it is an object of this invention to provide a tool which will permit the rapid and accurate installation of the fasteners where space and access to the panel may be limited.

To complete the installation of a fastener of the type of the above mentioned patent it is necessary to flare the reduced end portion of the sleeve to attach the sleeve to the panel generally in the manner of a grommet, and to crimp the opposite end of the sleeve, at the open end of the body portion, inwardly to form an inward caging flange for the stud head, the flange being then effective to prevent the escape of the stud under the pressure of the spring. According to one use of the invention, the flaring and crimping functions are performed consecutively by elements of the tool, while in a second use of the tool the two functions are performed concurrently by only part of the tool.

A further specific object of the invention is to provide an improved crimping tool comprising automatic means for retaining the stud in position during the crimping of the sleeve end.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a side elevation of a tool in accord with the invention;
FIG. 2 is a similar view but taken in section along the center plane of the tool;
FIGS. 3 and 4 are respectively similar fragmentary sectional views of portions of the tool and of a fastener and panel showing steps in the installation of the fastener to the panel;
FIGS. 5 and 6 are respectively similar fragmentary sectional views of other portions of the tool and including the portion of the panel and additional portions of the fastener showing further steps in the installation of the fastener; and
FIG. 7 is a fragmentary sectional view of portions of a tool slightly modified in construction, and showing a fastener positioned for installation by the tool to a panel.

Particularly with reference to FIGS. 1 and 2, 10 generally designates one embodiment of a combined flaring and crimping tool according to the invention. The specific embodiment shown includes parallel extending spaced side members 11 and 12 and cross member 17. Side member 11 has end portions 13 and 14 whereas side member 12 has end portions 15 and 16 respectively opposite and aligned with end portions 13 and 14.

End portion 15 has a conical flaring anvil 20 which is seated upon an annular shoulder 21 of the drilled aperture 22 and is retained in said aperture by means of a key 23 interlocking in a transverse manner with a side wall portion of the aperture 22 and the staff 24 which forms a portion of the anvil 20. The conical portion 25 of the anvil 20 has an apex 26 which points toward opposite end portion 13.

End portion 13 has a threaded aperture 27 and a screw member 28 threadedly engaged therein and aligned with said conical anvil 20. Screw member 28 has an inner terminating longitudinal aperture 29 within which, and against a thrust bearing ball 30 contained therein, is seated staff portion 31 of hollow cylindrical shoe 32, said shoe 32 being attached and retained for free rotation in the aperture 29 with respect to the screw member by means of snap ring 33 interlocking in a transverse manner with a side wall portion of the aperture 29 and the staff 31. The shoe 32 has an inside chamfer surface 34, the outer edge 35 of which junctures with the flat circular end face 36 of the shoe 32. As will be seen the shoe 32 is adapted to move toward and away from the anvil 20. Thus the inside chamfer surface 34 is adapted to meet coaxially with the conical flaring anvil 20 along the conical portion 25.

At the opposite end of screw member 28 is another internal terminating longitudinal aperture 37 which has a spring 38 therein under compression so as to frictionally hold ball 39 against transversely positioned lever arm 40. Lever arm 40 is positioned in aperture 41 which extends through hexagonal portion 42 of screw member 28 and intersects longitudinal aperture 37. It is thus apparent that by turning the lever arm 40 the screw member 28, through the engagement thereof with the threaded aperture, may be moved toward or away from anvil 20.

End portions 14 and 16 constitute a second pair of end portions. As will be seen this portion of the tool 10 may perform a dual function, one of which may be performed by the other pair of end portions of the tool.

End portion 14 of side member 11 has a hollow cylindrical anvil 43 seated against an annular shoulder 44 of the drilled aperture 45 and retained in said aperture by means of key 46 interlocking in a transverse manner with a side wall portion of the aperture 45 and the staff 47 which forms a portion of said anvil 43. The anvil 43 has outside chamfer working surfaces 48 the inner edge 49 of which junctures at the inner surface 50 of the hollow portion 50' of the anvil 43. As will be seen the hollow portion 50' of the anvil 43 is adapted to receive the shank of the studs employed for the spring loaded fasteners.

End portion 16 of side member 12 has a threaded aperture 51 and a screw member 52 threadedly engaged therein and aligned with the anvil 43. Screw member 52 has an inner terminating longitudinal aperture 53 within which, and against a thrust bearing ball 54 contained therein, is rotatably seated staff portion 55 of crimping die 56, said die 56 being attached and retained in the aperture 51 by means of a snap ring 57 interlocking in a transverse manner with a side wall portion of the aperture 51 and the staff 55 whereby said die 56 faces and is in alignment with anvil 43. The crimping die 56 has a concave inner working surface 58, which it will be seen is proportioned and adapted to engage an outer sleeve portion of the spring loaded fasteners at the outer extremities 59 of the concave portion, and a rim portion 60 which is adapted to receive the outer body portion of the sleeve and guide it into the concave working surface 58. The rim portion 60 extends from the extremities 59 of the concave inner working surface 58 to the forward edge 61 of the crimping die 56.

At the base 71 of the concave inner working surface 58 is another aperture 67 containing the staff portion 68 of cylindrical stud head depressing post 69, the face 70 of which terminates below the forward edge 61 of crimping die 56. Between the cylindrical portion of the post 69 and the concave inner working surface 58 there is an annular space 72. Although the embodiment discloses the post 69 as being disengageable from the crimping die 56 it will be apparent that the post 69 may be made integral therewith. It will be seen that the function of the post 69 is to depress the stud head during the crimping of the outer body portion of the sleeve which forms a part of the cam fasteners.

The crimping die 56 is in alignment with and adapted to move toward and away from the anvil 43. At the opposite end of screw member 52 is another internal terminating longitudinal aperture 62 which has a spring 63 therein under compression so as to frictionally hold ball 64 against transversely positioned lever arm 65. Lever arm 65 is positioned in aperture 62 which extends through hexagonal portion 66 of screw member 52 and intersects longitudinal aperture 62. It is thus apparent that by turning lever arm 65 the screw member 52 may be moved toward or away from anvil 43 through the engagement of the member 52 with threaded aperture 51.

With particular reference to the twist fastener and parts thereof shown in FIGS. 3 through 6, 73 generally denotes the assembled parts of the twist fastener which include, a sleeve 74 having a cylindrical body portion 75 and a reduced cylindrical end portion 76, a headed twist fastener stud element 77 having a shank 78 extending through the reduced end portion 76 and a head 79, and an ejection spring 80 disposed within the body portion 75 of the sleeve 74, coiled about the shank 78 and being compressible between the reduced end portion 76 of the sleeve 74 and the head 79.

According to one method of operation of the spring loaded applying tool of the invention the conical flaring anvil 20 and shoe 32 coact in a first step to engage the sleeve 74 of the twist fastener 73 within a beveled panel hole 81 of a panel 82 whereas, in a second step, the hollow cylindrical anvil 43 and crimping die 56 coact to crimp the outer portion of the sleeve body portion 75 inwardly to form an inward caging flange for the stud head 79. The first step is generally depicted in FIG. 3 and 4 and the second step is generally depicted in FIG. 5 and 6. According to a second method of operation the hollow cylindrical anvil 43 and crimping die 56 coact to perform simultaneously the first step an the second step. FIG. 7 illustrates the positioning of the elements prior to this concurrent accomplishment of the two functions while FIG. 6 is illustrative of the consummated crimping and flaring steps accomplished by the two stage operation of FIGS. 3–6.

In the following description, reference will be made to the movement of tool parts and it is deemed obvious that the accomplishment of such movements are through the action of the corresponding screw members associated therewith.

According to the first sep of the first mentioned method (see FIGS. 3 and 4) the cylindrical body portion 75 of the twist fastener is placed on the hollow cylindrical shoe 32, the shoe 32 being adapted to engage the shoulder juncture 83, between the cylindrical body portion 75 and the reduced end portion 76, along the flat circular end face 36 thereof. Thereafter, the reduced end portion 76 is positioned within the bevel hole 81 of panel 82, and the conical flaring anvil 20 and hollow cylindrical shoe 32 caued to come together so as to flare out the reduced end portion 76 in the beveled portion of the hole 81. Of course during the process of this step the sleeve 74 may first be placed in the hole 81 and thereafter engaged within by the hollow cylindrical shoe 32.

The hollow portion of the shoe 32 merely serves to receive the apex 26 of the anvil 20 during the final stages of the step. It will be apparent that, depending upon the thickness of plate 82 and/or the pitch of the cone portion of the anvil 20, the shoe 32 may or may not necessarily have a hollow portion for the reception of the apex of the cone portion. Similarly, although the anvil 20 is illustrated as having a cone portion 25, only a frusto-conical surface area thereof is actually employed to engage the inner edges of the reduced end portion 76 so as to cause it to flare into the beveled portion of hole 81.

According to the second step of the first mentioned method (see FIGS. 5 and 6) after the stud element 77 and spring 80 have been positioned in the already-fixed sleeve 74, the elements associated with the second pair of end members 14 and 16 are employed for crimping the outer portion of the cylindrical body portion 75. Thus, the outside chamfer working surface 48 of the hollow cylindrical anvil 43 is positioned to engage the inner side edge portion of the already flared reduced cylindrical end portion 76 and the face 70 of post 69 of the crimping die 56 is caused to engage the head 79 of the stud element 77 so as to compressibly force the shank 78 through the reduced cylindrical end portion 76 into the hollow portion 50' of the anvil 43. The face 70 of the post 69 is positioned below the forward edge 61 and above the inner concave working surface 58 so as to depress the head 79 within the body portion 75 prior to the actual crimping of the outer portion of the cylindrical body portion 75 of the sleeve 74. As the head 79 is being depressed through contact with the face 70 of the post 69, the outer portion of the sleeve cylindrical portion 75 is received within the rim portion 60 of the die 56. The rim portion 60 serves to guide the outer portion of the sleeve to the outer extremities of the concave working surface 58 whereat the outer portions of the sleeve are crimped as the crimping die 56 and anvil 43 come closer together. The crimping step thus confines the head 79 of the stud element 77 within the sleeve 74.

FIGURE 7 illustrates a crimping die 56' having a stud head depressing post 69', identical with post 69 of FIGURE 2, except that it is formed integral with die 56'.

According to the concurrent crimping and flaring method (FIG. 7) accomplished through the coacting of the hollow cylindrical anvil 43 and crimping die 56', the stud element 77, spring 80 and sleeve 74 are assembled and the sleeve positioned in the hole 81 of the work in a manner as previously explained relative to the procedure resulting in the relationship seen in FIG. 5. Thereafter, the stud head 79 is depressed within the sleeve through the engagement thereof with the face 70 of die post 69', and the counter acting engagement of the inner edge of the reduced cylindrical end portion 76 with the outside chamfer working surface 48 of anvil 43. Thereafter as the die 56' and anvil 43 are brought closer together the outer portion of the sleeve body portion is crimped by engaging the concave working surface 58, and the reduced end portion 76 is flared into the beveled portions of hole 81. It is essential in this tool use shown in FIGURE 7 that the inner edge of the chamfer working surface 48 be constructed so that it can fall within the inner portion of the reduced end portion 76 whereas this entering feature is not essential where the chamfer working surface 48 is only employed to engage an already flared reduced end portion, as shown in FIGURES 4, 5, and 6.

The left hand portion of the tool disclosed in FIGURE 1, i.e. the portion having the conical flaring anvil element and the hollow cylindrical shoe element oppositely mounted, is a staking tool, whereas the right hand portion of the tool in FIGURE 1, i.e. the portion having the crimping die and hollow cylindrical anvil elements oppositely mounted, is a crimping tool which may also be employed as a combined staking and crimping tool in a manner such as illustrated in FIGURE 7. It will be observed in the drawings that the hollow cylindrical shoe is rotatably mounted on a screw member threadedly engaged in one of the side member end portions whereas the conical flaring anvil is fixedly mounted on an opposite end portion of the other side member. The hollow cylindrical shoe may be fixedly mounted on one of the side member end portions and the conical flaring anvil rotatably mounted on a screw member threadedly engaged in an opposite end portion of another side member in contrast to this arrangement. Likewise the embodiment illustrated in the drawings discloses a hollow cylindrical anvil element that is fixedly mounted on the end portion of one of the side members and a crimping die element that is rotatably mounted on a screw member threadedly engaged in an opposite end portion of the other side member. Similarly, the crimping die element may be fixedly mounted on one of the end portions and the hollow cylindrical anvil element rotatably mounted on an oppositely disposed screw member.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a flaring and crimping tool for installing a panel twist fastener of the type comprising a sleeve having a cylindrical body portion, a shoulder and a cylindrical reduced end portion separated from the body portion by said shoulder, the sleeve having opposite open ends at its body portion and reduced end portion, respectively, a fastener stud having a shank extending through said reduced end portion and a head adapted for disposition within the sleeve body portion, and a coiled ejection spring disposed within the body portion of the sleeve about the stud shank and between the stud head and the sleeve shoulder, the combination of a cylindrical anvil element having an inside surface defining a circular hollow therein and having an outside chamfer working surface that junctures with said inner surface along a circular end edge defining an entrance opening for the stud shank into said hollow, a crimping die element having a stud-depressing post and a cup-shaped concave inner working surface tapering curvedly inwardly to said post, said post extending centrally upwardly from the bottom of said inner working surface and terminating in a stud-head-engaging face, said post and inner working surface defining therebetween an annular space outwardly of and below said face, a rigid yoke member having two opposing end portions and having a screw member threadedly engaged in one of said portions and extending toward the opposite end portion and terminating toward said opposite end portion in an apertured end, and a thrust bearing ball in said end aperture, said crimping die element being rotatably mounted in said aperture and seated against said thrust bearing ball, said cylindrical anvil element being fixedly mounted on the opposite end portion of said yoke member opposite to and in alignment with said crimping die element, and, in response to forcing of said die by means of said screw member toward said anvil element with said fastener therebetween, said anvil element being adapted and arranged for engagement of its said working surface within the open end of the reduced end portion of the sleeve, said post being adapted and arranged to engage its said face with the head of the stud and to depress the stud head against the ejection spring and thereby to extend the stud shank through the open end of the reduced end portion of the sleeve and through said entrance opening into the hollow portion of said anvil element with said circular end edge surrounding the stud shank and entering within the reduced end portion of the sleeve, and said crimping die element being adapted and arranged to engage its said concave inner working surface with the open end of the sleeve body portion and to crimp the open end of the body portion inwardly to form a caging flange about said depressed head.

2. In a flaring and crimping tool for installing twist fasteners in a panel, each of the fasteners including a spring loaded stud, the combination of a cylindrical anvil element, a crimping die element and means for movably mounting one of said elements comprising a screw member carrying a thrust bearing, said thrust bearing mounting said one element on said screw member, means for positioning said elements in coaxial alignment comprising a pair of side members having respectively opposite and aligned end portions, a rigid cross member interconnecting said side members, a mounting for the other of said elements on an end portion of one of said side members, said screw member being threadedly engaged in an end portion of the other of said side members, said cylindrical anvil element having an inner surface defining a hollow portion thereof, said crimping die element having a post fixed therein for depressing the fastener stud and a concave inner working surface tapering downwardly and inwardly to said post, said post having a face for engaging the head of the fastener stud extending upwardly from the bottom of said concave working surface, and said face being separated from said concave working surface by an annular space outwardly of and below said face.

3. A combination flaring and crimping tool for installing twist fasteners in a panel comprising a flaring anvil element and a crimping die element, means for positioning said elements in coaxial alignment including means for relatively moving said elements toward and away from each other, said positioning means comprising a pair of side members having respectively opposite and aligned end portions, a rigid cross member interconnecting said side members, a mounting for one of said elements on an end portion of one of said side members, a screw member threadedly engaged in an end portion of the other of said side members, said end portion of said other of said side members being opposite to and aligned with said end portion of said one of said side members, and a thrust bearing mounting the other of said elements on said screw member, said flaring anvil element having an inner surface defining a hollow portion thereof and also having an outside chamfer working surface for flaring the fastener, said crimping die element having a post fixed therein and upstanding from a concave working surface of said crimping die element tapering downwardly and inwardly to said post for crimping the fastener, said post having a face extending upwardly from the bottom of said concave inner working surface, and said face being separated from said concave working surface by an annular space outwardly of and below said face.

References Cited in the file of this patent

UNITED STATES PATENTS

| | | |
|---|---|---|
| 625,751 | Foote | May 30, 1899 |
| 667,278 | Yager | Feb. 5, 1901 |
| 1,524,927 | Hagen | Feb. 3, 1925 |
| 2,337,742 | Dittmar | Dec. 28, 1943 |
| 2,415,769 | Stenson | Feb. 11, 1947 |
| 2,506,657 | Webster | May 9, 1950 |
| 2,533,870 | Bayer | Dec. 12, 1950 |
| 2,604,258 | Murnane et al. | July 22, 1952 |

UNITED STATES PATENT OFFICE
CERTIFICATE OF CORRECTION

Patent No. 3,073,474                      January 15, 1963

Fred M. Gibson et al.

It is hereby certified that error appears in the above numbered patent requiring correction and that the said Letters Patent should read as corrected below.

Column 3, line 7, for "surfaces" read -- surface --; column 4, line 18, for "sep" read -- step --; line 27, for "caued" read -- caused --; same column, line 28, for "in" read -- into --.

Signed and sealed this 16th day of July 1963.

(SEAL)
Attest:

ERNEST W. SWIDER
Attesting Officer

DAVID L. LADD
Commissioner of Patents